United States Patent [19]
Gries et al.

[11] Patent Number: 5,043,637
[45] Date of Patent: Aug. 27, 1991

[54] TRANSFORMER COUPLED VOLTAGE CLAMP FOR PINCUSHION CORRECTION CIRCUIT

[75] Inventors: Robert J. Gries; James A. Wilber, both of Indianapolis; Jeffery B. Lendaro, Noblesville, all of Ind.

[73] Assignee: Thomson Consumer Electronics, Inc., Indianapolis, Ind.

[21] Appl. No.: 627,804

[22] Filed: Dec. 14, 1990

[51] Int. Cl.$^5$ .............................................. H01J 29/56
[52] U.S. Cl. ................................................... 315/371
[58] Field of Search ........................ 315/371, 400, 408

[56] References Cited

U.S. PATENT DOCUMENTS

| | | | |
|---|---|---|---|
| 4,329,729 | 5/1982 | Knight | 361/91 |
| 4,594,534 | 6/1986 | Haferl | 315/408 |
| 4,910,441 | 3/1990 | Wetta | 315/371 |
| 4,916,366 | 4/1990 | Wilber et al. | 315/411 |

Primary Examiner—Theodore M. Blum
Attorney, Agent, or Firm—Joseph S. Tripoli; Joseph L. Laks; Harvey D. Fried

[57] ABSTRACT

A horizontal deflection system comprises a horizontal deflection yoke and a resonant retrace circuit coupled to the yoke and to a switched energy source for generating a horizontal deflection current in the yoke. A diode modulator is coupled to the resonant retrace circuit. A control circuit operable in a switched mode supplies a control signal to the diode modulator for modifying the deflection current to correct for side pincushion distortion. A transformer has a first winding coupled to the diode modulator and to the control circuit for recovering energy from the diode modulator. The transformer has a second winding for receiving the recovered energy from the first winding. A diode clamp is coupled to the second winding and to a load driven by a voltage source at a first voltage level, for transferring the recovered energy from the second winding to the load. The energy is transferred from the first winding to the second winding at a second voltage level across the first winding determined by the first voltage level and the turns ratio of the transformer. The second voltage level defines an effective voltage clamping level and is related to the operating range of the diode modulator. The second voltage level can be adjusted to levels different from the first voltage level by changing the turns ratio of the transformer.

28 Claims, 2 Drawing Sheets

TRANSFORMER COUPLED VOLTAGE CLAMP FOR PINCUSHION CORRECTION CIRCUIT

This invention relates generally to the field of deflection circuits for television apparatus, and in particular, to voltage clamps for switched mode pincushion correction circuits.

Diode modulators can be utilized in horizontal deflection circuits for modifying the horizontal deflection current, for example, to correct for side pincushion distortion. The horizontal deflection current is modulated by a parabolic signal at a vertical rate, as is well known in the art. The pincushion correction circuit can be operated in a switched mode in order to conserve energy, as is also well known. A typical prior art circuit is shown in FIG. 1. A diode modulator 12 comprises a network having three parallel legs or paths. One leg is a retrace capacitor Crt. A second leg is a damper diode D3. A third leg includes a modulating inductor Lm and a modulating capacitor Cm coupled in series. One junction of the parallel network is coupled to a resonant retrace circuit 24. Resonant retrace circuit 24 includes a horizontal yoke Lh, an S-shaping capacitor Cs, a linearity inductor Llin, another damping diode D2 and a deflection retrace capacitor Crd. The other junction of the parallel network of the diode modulator may be coupled to ground.

A control signal is supplied to the diode modulator at the junction of the modulating capacitor Cm and the modulating inductor Lm by a pincushion switch. The pincushion switch is shown as the output switch of a pincushion correction circuit operating in a switched mode. The output switch is transistor Q1. The emitter of transistor Q1 is grounded. The base of transistor Q1 receives a pulse width modulated signal which reflects a vertical rate parabola, the waveform used to correct side pincushion distortion. Transistor Q1 acts as a switch controlled by the pulse width modulated signal. Power dissipation in transistor Q1 is reduced by restricting operation to saturated or cut off conditions.

Varying the modulating current Im causes variation of voltage Vm across capacitor Cm. The B+ voltage supplied to the deflection yoke is constant. The voltage Vm varies with current Im. Therefore, the voltage across the S-shaping capacitor Cs must be equal to the difference between the B+ voltage and voltage Vm. Current Im varies as a vertical rate parabola, and accordingly, voltage Vm also varies mainly at a vertical rate. The average value of the voltage Vm, that is the DC component, is a function of the average duty cycle of the base drive to transistor Q1. The duty cycle of the voltage Vm is a function of the pulse width modulating signal at the base of the transistor switch. The trace voltage, which determines the peak value of the horizontal deflection scanning current, equals the difference between the B+ voltage and the value of the voltage Vm. Accordingly, decreasing the value of the modulator voltage Vm increases the value of the trace voltage and increases the amplitude of the horizontal scanning current. Conversely, increasing the value of the voltage Vm decreases the value of the trace voltage and decreases the amplitude of the horizontal scanning current. In order to correct side pincushion distortion, the amplitude of the horizontal deflection scanning current must be greatest at the center of vertical trace and least at the top and bottom of vertical trace. This is achieved by modulating the pulse width with a vertical rate parabola signal.

If inductor L1 is open circuited, the voltage across capacitor Cm will be approximately equal to the inductance Lm divided by the sum of the inductances Lm and Ly, where Ly is the inductance of the yoke circuit, the quotient multiplied by the B+ voltage. The ratio of inductance determines the modulating capability, defining an upper voltage level of a modulating range. This upper voltage determines the minimum horizontal yoke current needed to keep the pincushion circuit linear.

Transistor Q1 acts as a pulse width modulated controlled switch. Operating transistor Q1 only in saturation or cut off reduces dissipation in transistor Q1 to a minimum. When transistor Q1 is turned on, energy is transferred from the electric field in capacitor Cm to a magnetic field in inductor L1. This lowers the voltage Vm across capacitor Cm.

Current ramps up in inductor L1 when transistor Q1 is on. When transistor Q1 turns off, a reverse emf is developed across inductor L1 to keep the current flowing. With no other path for this current, the reverse emf raises the voltage at the collector of transistor Q1. The clamp diode D1 serves to clamp this rising voltage, as well as to recover this stored energy, further increasing efficiency. Capacitor C1 acts to limit this dv/dt until diode D1 can turn on, lowering the peak voltage on transistor Q1 and helping reduce radio frequency interference. In order for the diode D1 to properly clamp and recover this energy, the load on the supply must be greater than the power delivered by the diode modulator, or the supply voltage will rise. Transient and fault conditions can also increase the voltage Vm to levels greater than the peak modulator voltage developed under normal operating conditions. This increased modulator capacitor voltage is applied to the control circuit, particularly the output switching transistor. The overvoltage stress can damage the transistor and other components in the control circuit. Diode D1 is coupled to a convenient voltage source +Vload.

The term convenient has important implications in this context. Firstly, the voltage level of the diode clamp sets the upper limit of the operating range of the diode modulator. The upper limit must be high enough to compensate for the particular cathode ray tube driven by the deflection circuit. Accordingly, the voltage source must be larger in magnitude than the necessary upper limit. Secondly, the output switch is subject to damage from inductive overvoltage conditions which can occur when the transistor turns off. The voltage source must be sufficiently loaded by other circuitry as to be able to dissipate the recovered energy from inductor L1. Thirdly, the voltage source should not be much larger than is necessary. Otherwise, considerable energy can be wasted through dissipation.

In FIG. 1, for example, it is assumed that the necessary voltage level for the operating range of the diode modulator is in the range of 25 volts to 30 volts, and that +Vload is a heavily loaded +32 volt source. The voltage clamp can operate safely under these conditions, and without wasting energy. However, a number of circumstances can render the voltage clamp inefficient, or even inoperable. If the operating range of the diode modulator requires more than +32 volts, the voltage source must be changed. Such a source may not be available, or if available, may not be adequately loaded. If the load on the +32 volt source is small, the transistor may be damaged because the overvoltage condition can drive the voltage source out of regulation, causing damage elsewhere as well.

In accordance with an inventive arrangement, the voltage clamp can be adjusted to accommodate the operating range of the diode modulator irrespective of the level of the voltage source coupled to the voltage clamp, even if the voltage level is markedly different from the upper limit value. A deflection system according to this inventive arrangement comprises a circuit for generating a resonating deflection current and a circuit for modulating the deflection current. A control circuit operable in a switched mode supplies a control signal to the diode modulator for modifying the deflection current to correct for side pincushion distortion. A transformer has a first winding coupled to the diode modulator and to the control circuit for recovering energy from the diode modulator. The transformer has a second winding for receiving the recovered energy from the first winding. A diode clamp is coupled to the second winding and to a load driven by a voltage source at a first voltage level, for transferring the recovered energy from the second winding to the load. The energy is transferred from the first winding to the second winding at a second voltage level across the first winding determined by the first voltage level and the turns ratio of the transformer. The second voltage level defines an effective voltage clamping level and is related to the operating range of the diode modulator. The second voltage level can be adjusted to levels different from the first voltage level by changing the turns ratio of the transformer.

As an example, a secondary winding of the transformer is coupled between ground and the anode of a clamping diode. The cathode of the clamping diode is coupled to a heavy load driven by a +16 volt source. A primary winding of the transformer is coupled between a diode modulator and the output stage of a pincushion correction circuit. The diode modulator controls the deflection current in a resonant retrace deflection circuit to correct for pincushion distortion. The primary winding is more particularly coupled to the output switch of the pincushion correction circuit, for example the collector electrode of a bipolar transistor or the drain of a MOS-FET transistor, which operates in a switched mode.

Accordingly, the clamping diode is inductively coupled to the output transistor through the transformer, instead of being directly connected to the output transistor. The maximum value of voltage Vm may be in the range of 25 to 30 volts. A voltage source, suitably loaded, may be only +16 volts. Heretofore, such a source would not be suitable. However, by choosing an appropriate turns ratio for the transformer, for example 2:1 from the primary winding to the secondary winding, a +32 volt clamp level at the output switch can be stepped down to approximately +16 volts. The +16 volt source can thus accommodate the upper limit of the operating range of the diode modulator. The +16 volt source is now a convenient clamping source. If any overvoltage condition results in enough current through the primary winding to cause the voltage level to exceed approximately +32 volts, a corresponding voltage will be induced in the secondary winding somewhat in excess of approximately +16 volts, which will cause the clamping diode to conduct and transfer energy from the transformer to the +16 volt load. Almost any adequately loaded voltage source, irrespective of its voltage level, can now be a convenient voltage source for a voltage clamp.

According to a further inventive arrangement, a transformer coupled voltage clamp is fully compatible with a horizontal deflection system incorporating correction of side pincushion distortion. A horizontal deflection system according to this inventive arrangement comprises a horizontal deflection yoke and a resonant retrace circuit coupled to the yoke and to a switched energy source for generating a horizontal deflection current in the yoke. A diode modulator is coupled to the resonant retrace circuit. A control circuit supplies a control signal to the diode modulator for modifying the deflection current to correct for side pincushion distortion. A diode clamp is coupled to a load driven by a voltage source at a first voltage level. A transformer has a first winding coupled between a reference potential and the diode clamp and a second winding coupled between the diode modulator and the control circuit. A second voltage source at a second voltage level relative to the reference potential is developed in the second winding. The second voltage level defines the effective clamping voltage, that is, the upper limit of the operating range of the diode modulator. The second voltage level can be adjusted to a plurality of levels different from the first voltage level by changing the turns ratio of the transformer.

According to yet another inventive arrangement, energy is recovered from a deflection current modulator and utilized for supplying energy to other loads in a television receiver. An energy recovery deflection system according to this inventive arrangement comprises a resonant retrace modulator for modifying a deflection current and a first switch for controlling the modulator. A polarized switch is coupled to a load driven by a voltage source. A transformer has a first winding coupled to the modulator and to the first switch for conducting a first current in the first winding when the first switch is conducting. Energy recovered from the modulator is stored in the first winding when the first switch is conducting. The transformer has a second winding coupled to the polarized switch for conducting a second current to the load through the polarized switch when the first switch becomes nonconducting, for transferring energy from the modulator stored in the first winding to the second winding, and then to the load. The first winding tries to maintain the current therethrough after the first switch becomes nonconducting. The voltage on the winding rises rapidly. Energy is transferred to the second winding, developing a voltage on the second winding. As soon as the polarized switch becomes conductive, as for example a diode becoming forward biased, the current flows into the load and the energy is transferred.

Figure 2:
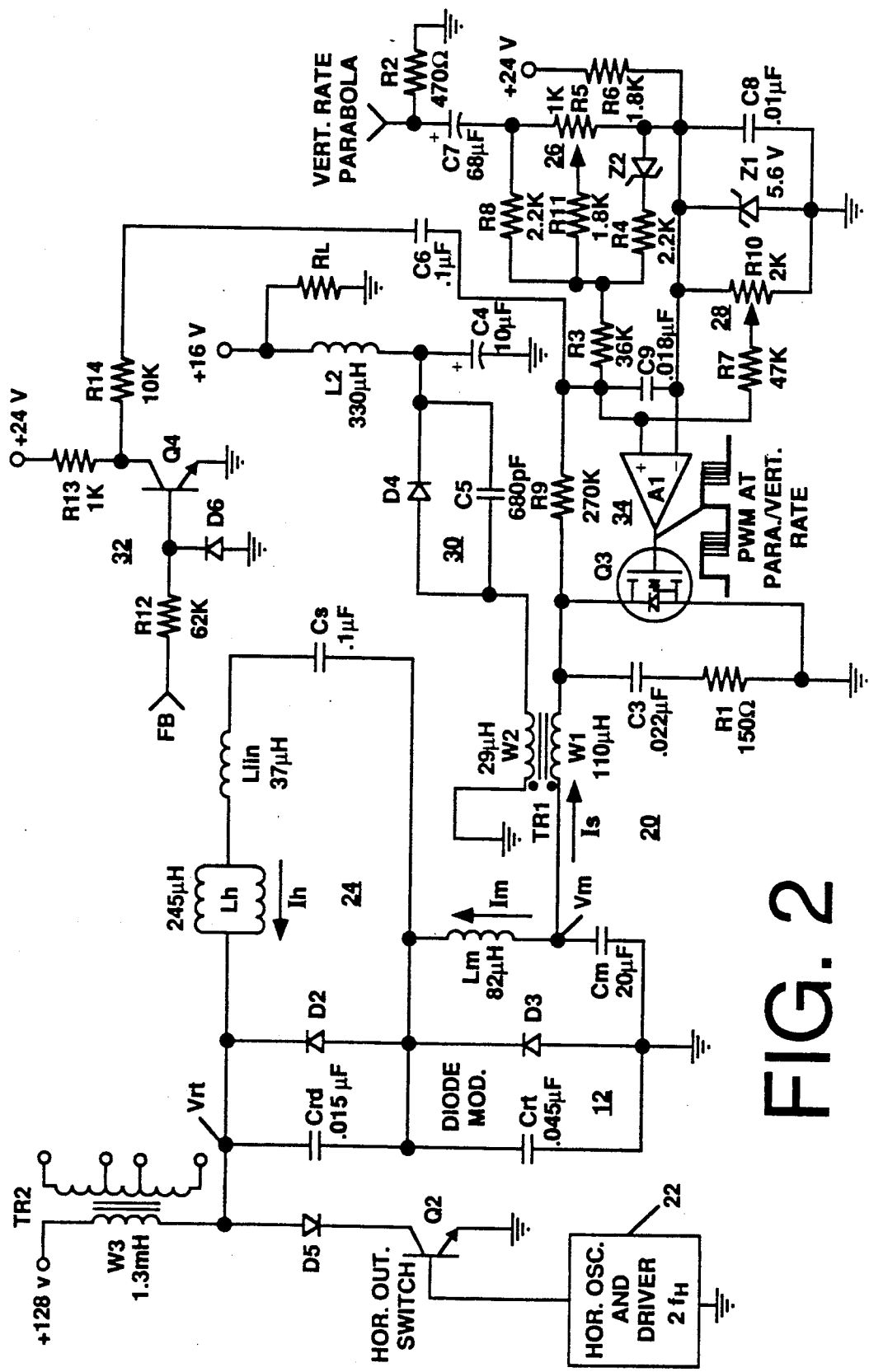
FIG. 2 is a circuit schematic of a switched pincushion correction circuit, incorporating a diode modulator and having a transformer coupled voltage clamp according to inventive arrangements taught herein.

A horizontal deflection system 20 is shown in schematic form in FIG. 2. The horizontal deflection system 20 incorporates a transformer coupled voltage clamp 30 for a pincushion correction circuit 34. The voltage clamp 30 is not coupled directly to the pincushion switch transistor Q3. Instead, voltage clamp 30 is coupled to one terminal of a secondary winding W2 of transformer TR1. The other terminal of winding W2 is coupled to a source of a reference potential, for example ground. The primary winding W1 of transformer TR1 is coupled between the diode modulator 12 and transistor Q3. The voltage clamp 30 is coupled to a +16 volt source, which is at a voltage level considerably below the upper limit of the operating range of the diode modulator, which is still assumed to be in the range of +25 volts to +30 volts. The +16 volt source drives a load RL, which is deemed to be adequately loaded for use in a voltage clamping arrangement. Clearly, +16 volts is not high enough for proper operation of the diode modulator to fully correct pincushion distortion, even though it is adequately load by RL. However, by choosing the proper turns ratio of windings W1 and W2, almost any voltage level can be developed in winding W1, by stepping up or stepping down the voltage level of the source coupled to the voltage clamp 30. In this example, a turns ratio of 2:1 from primary winding W1 to secondary winding W2 will develop an effective voltage clamping level on the drain of MOS-FET transistor Q3 which is the sum of approximately +32 volts and voltage Vm.

Energy is transferred from capacitor Cm to transformer TR1 when transistor Q3 conducts. When transistor Q3 subsequently turns off, a reverse emf is developed. Absent a conductive path for the current in either of windings W1 and W2, the voltage at the undotted terminal of winding W1 rises. The turns ratio is such that the voltage at the anode of diode D2 will cause diode D2 to conduct and transfer the energy from transformer TR1 to the +16 volt load. The turns ratio will allow diode D2 to conduct before the voltage across transistor Q3 rises sufficiently to break down transistor Q3.

Overvoltage conditions may occur frequently, for example after many, if not all of the times transistor Q3 turns off. A voltage signal in excess of the sum of +16 volts and the voltage drop across diode D2 will cause diode D2 to conduct and divert energy from the transformer TR1 to the load RL of the +16 volt source instead of to transistor Q3. Winding W1 may not be as effective a filter as choke inductor L1 in smoothing the level of voltage Vm, depending upon the construction of transformer TR1. In this circuit, the choke is turned on and off completely each cycle. Even so, somewhat more ripple can be well tolerated as a trade off for the enhanced flexibility in choosing a voltage source for the voltage clamp.

Considering now the entire deflection circuit 20, a winding W3 of a flyback transformer TR2 and a diode D3 are coupled in series between a source of regulated B+ voltage, for example +128 volts, and the collector of a horizontal output transistor switch Q2. A horizontal oscillator and driver circuit 22 supplies a control signal to the base of transistor Q2. The control signal may be at $2f_H$, where $f_H$ is the standard horizontal scanning frequency in a conventional interlaced NTSC system, that is, approximately 15.7 KHz. The $2f_H$ double scanning rate, approximately 32 KHz, can be used for noninterlaced scanning. Various inductances in a $2f_H$ deflection system are generally smaller than those in a $1f_H$ system. All aspects of the invention are appropriate for use at all scanning frequencies, and in systems other than NTSC.

The winding W3 of the flyback transformer TR2 is also coupled to a resonant retrace circuit 24. Resonant retrace circuit 24 includes a deflection retrace capacitor Crd, a damper diode D2, a horizontal deflection yoke Lh, a linearity inductor Llin and an S-shaping capacitor Cs. The horizontal rate switching of transistor Q2 generates a horizontal deflection current Ih in the horizontal deflection yoke and a retrace pulse voltage Vrt at the junction of capacitor Crd and diodes D3 and D4. The horizontal deflection current Ih is approximately 14.3 amps peak to peak.

A diode modulator 12 enables the deflection current Ih to be modulated by voltage Vm to provide side pincushion correction of the raster scanned on a cathode ray tube. The diode modulator includes a modulator retrace capacitor Crt, a modulator damper diode D3, a modulator inductor Lm and a modulator capacitor Cm. The modulator voltage Vm developed across capacitor Cm is modulated by a pincushion control circuit 34 to provide the side pincushion correction. A modulating current Im flows through modulating inductor Lm, dependent upon the voltage across capacitor Cm. When the control circuit cuts off, a sink current Is continues to flow through the winding W1. Sink current Is is approximately 2.1 amps peak to peak. Diode D4 will conduct after each conduction of transistor Q3. Energy is thus transferred to the load RL of the +16 volt source through transformer TR1.

Figure 1:
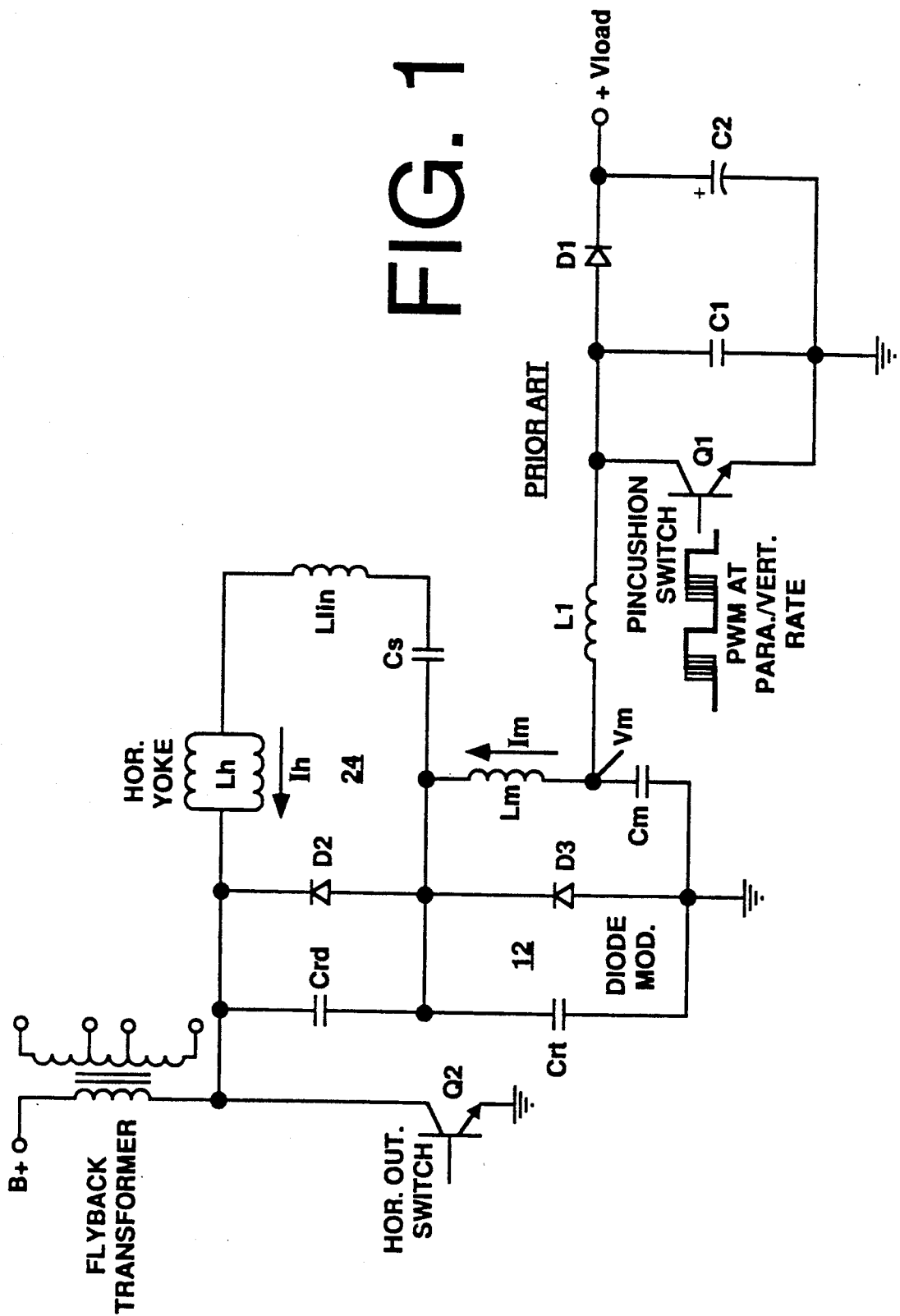
FIG. 1 is a partial circuit schematic of a switched pincushion correction circuit, incorporating a diode modulator, according to the prior art.

Control circuit 34 includes an comparator A1 and an output pincushion switch transistor Q3, enabling operation of the pincushion correction circuit in a switched mode, to conserve energy. Transistor Q3 is shown as a MOS-FET device, having its drain electrode coupled to winding W1, its source electrode coupled to ground and its gate electrode coupled to the output of comparator A1. Such switched mode control circuits can be coupled to the diode modulator through an inductor, as shown for example by inductor L1 in FIG. 1. The inductor can limit current and protect the control circuit from high frequency signals. A choke filter can be substantially a short circuit at lower frequencies. In the circuit shown in FIG. 2, and according to an inventive arrangement, the control circuit is coupled to the diode modulator by an inductor which is at the same time a winding W1 of a transformer TR1. Comparator A1 has four inputs, three coupled to the noninverting input and one coupled to the inverting input.

One input is generated by a switching circuit 32, including transistor Q4, diode D6, capacitor C6 and resistors R12 and R13. Circuit 32 is conductive responsive to an input retrace pulse signal FB. Resistor R14 renders the circuit 32 a current source. The current source signal is AC coupled to the noninverting input of comparator A1 through capacitor C6. A repetitive ramp signal is developed across capacitor C9. A parabola generator, not shown, provides a vertical rate parabola to the junction of resistor R2 and capacitor C7. An adjustable resistive network 26 includes resistors R8, R11 and R5. Network 26 provides amplitude adjustment. An adjustable resistive network 28 includes resistors R7 and R10. Network 28 provides a DC level to control raster width. The horizontal ramp input, the parabola input and the DC level from the width control are combined at the noninverting input of comparator A1. The inverting input of comparator A1 is a reference voltage determined by Zener diode Z1, which is rated at 5.6 volts in the circuit shown. The reference voltage can be other values as well, for example ground. A negative feedback path is provided by resistor R9. When the voltage level at the noninverting input of comparator A1 exceeds the reference voltage at the inverting input, transistor Q3 will be turned on to control the side pincushion modulating voltage Vm.

The dynamic operating range of the diode modulator is determined by the difference between the voltage at the drain of transistor Q3 and the Zener reference voltage. The width of the output pulses determines the conduction time of transistor Q3. Conduction of transistor Q3 modulates the sink current Is. Sink current Is in turn controls the DC average value component that, in turn, controls the average value of the voltage Vm across capacitor Cm. Voltage Vm is essentially the same as the average value of the voltage at the drain terminal of transistor Q3. The voltage at the drain terminal of transistor Q3 is a function of the duty cycle of transistor Q3. The duty cycle of transistor Q3 varies at a vertical parabolic rate. As a result of the parabolic modulation, the instant within horizontal retrace when transistor Q3 becomes conductive occurs earlier at the center of vertical trace than at the top and bottom of vertical trace. The average value of the level of voltage Vm is at a minimum at the center of vertical trace and at a maximum at the top and bottom of vertical trace. Consequently, the amplitude of the composite deflection current Ih+Im is at a maximum at the center of vertical trace and at a minimum at the top and bottom of vertical trace, thereby providing side pincushion correction.

The voltage clamp circuit 30 employs clamping diode D4. The anode of diode D4 is coupled to one terminal of winding W2 of transformer TR1. The other terminal of winding W2 is coupled to a fixed source of potential, for example ground, as shown. The cathode of clamp diode D4 is coupled to the load RL of the +16 volt source through an inductor L2. Inductor L2 functions as a filter choke, to prevent modulation of the voltage source by horizontal rate or higher signals in the diode modulator, which might couple through transformer TR1 from winding W1 to winding W2, for example retrace pulses or pulses resulting therefrom. The filter choke is substantially a short circuit at lower frequencies. The diode clamp will protect the transistor Q3 from transient overvoltage conditions, provided that the +16 volt source is sufficiently loaded by RL. Capacitor C5 is coupled in parallel with diode D4 for damping ringing. Moreover, energy can be recovered from the winding W1. The energy is transferred to the load RL of the +16 volt source by operation of the diode clamp. In other words, none of the existing advantages of diode clamps is compromised by use of a transformer coupled diode clamp according to all of the aspects of this invention.

In accordance with another inventive arrangement, the supply voltage for the transistor Q3, which determines the upper limit of the available pincushion correction current and modulating voltage, can be easily set to a desired value by using different transformers TR1 having different turns ratios. The effective voltage clamping level can be stepped up or stepped down. It must be remembered, of course, that the magnitude of the induced current will step up or down inversely with the turns ratio. In the example shown, the turns ratio is 2:1 from winding W1 to winding W2. This provides an effective clamping voltage for transistor Q3 at the sum of approximately +32 volts and voltage Vm.

The inventive arrangements taught herein significantly simplify implementation of switched mode pincushion correction circuits, by making a larger number of voltage sources feasible for voltage clamping.

What is claimed is:
1. A deflection circuit, comprising:
   means for generating a resonating deflection current;
   means for modulating said deflection current;
   means operable in a switched mode for supplying a control signal to said modulating means to correct for raster distortion;
   a transformer having a first winding coupled to said modulating means and to said supplying means for recovering energy from said modulating means and a second winding for receiving said recovered energy from said first winding; and,
   clamping means coupled to said second winding and to a load driven by a voltage source at a first voltage level, for transferring said recovered energy from said second winding to said load, energy being transferred from said first winding to said second winding at a second voltage level across said second winding determined by the turns ratio of said transformer.
2. The circuit of claim 1, wherein said first winding is coupled between said modulating means and said supplying means.
3. The circuit of claim 1, wherein said second winding is coupled between a source of ground potential and said clamping means.
4. The circuit of claim 1, wherein said clamping means is coupled between said second winding and said voltage source.
5. The circuit of claim 1, wherein said clamping means comprises a diode.
6. The circuit of claim 1, wherein said clamping means comprises a diode coupled between said second winding and said voltage source.
7. The circuit of claim 1, wherein said supplying means comprises an output switch responsive to a pulse width modulating signal varying as a vertical rate parabola.
8. The circuit of claim 1, wherein said modulating means comprises a diode modulator.
9. A deflection circuit, comprising:
   means for generating a resonating deflection current;
   means for modulating said deflection current;
   means operable in a switched mode for supplying a control signal to said modulating means to correct for raster distortion;
   means for clamping voltage coupled to a load driven by a voltage source at a first voltage level; and,
   a transformer coupled to said voltage clamping means, to said supplying means and to said modulating means, for recovering energy from said modulating means and for transferring said recovered energy to said load through said clamping means, said transformer establishing a second voltage level, determined by the turns ratio of said transformer, at which said recovered energy is transferred by said transformer.
10. The circuit of claim 9, wherein said transformer has a first winding coupled to said modulating means and to said supplying means.
11. The circuit of claim 9, wherein said second winding is coupled to said clamping means and to a source of ground potential.
12. The circuit of claim 9, wherein said transformer has a first winding coupled to said modulating means and to said supplying means and has a second winding coupled to said clamping means and to a source of ground potential.

13. The circuit of claim 9, wherein said clamping means comprises a diode coupled between said second winding and said voltage source.

14. The circuit of claim 9, wherein said modulating means comprises a diode modulator.

15. The circuit of claim 9, wherein said supplying means comprises an output switch responsive to a pulse width modulating signal varying as a vertical rate parabola.

16. A horizontal deflection system, comprising:
a horizontal deflection yoke;
a resonant retrace circuit coupled to said yoke and to a switched energy source for generating a horizontal deflection current in said yoke;
a diode modulator coupled to said resonant retrace circuit;
means operable in a switched mode for supplying a control signal to said diode modulator for modifying said deflection current to correct for side pincushion distortion;
a transformer having a first winding coupled to said diode modulating means and to said supplying means for recovering energy from said diode modulating means and a second winding for receiving said recovered energy from said first winding; and,
a diode clamp coupled to said second winding and to a load driven by a voltage source at a first voltage level, for transferring said recovered energy from said second winding to said load, energy being transferred from said first winding to said second winding at a second voltage level across said second winding determined by the turns ratio of said transformer.

17. The circuit of claim 16, wherein said first winding is coupled between said diode modulating means and said supplying means.

18. The circuit of claim 16, wherein said second winding is coupled between said diode clamp and a source of ground potential.

19. The circuit of claim 16, wherein said first winding is coupled between said diode modulating means and said supplying means and said second winding is coupled between said diode clamp and a source of ground potential.

20. A deflection circuit, comprising:
resonant retrace means for modulating a deflection current;
first switching means for controlling said modulating means;
polarized switching means coupled to a load driven by a voltage source; and,
a transformer having a first winding coupled to said modulating means and to said first switching means for conducting a first current in said first winding when said first switching means is conducting and having a second winding coupled to said polarized switching means for conducting a second current to said load through said polarized switching means when said first switching means becomes nonconducting, for transferring energy from said modulating means to said load.

21. The circuit of claim 20, wherein said polarized switching means conducts when said first winding develops a second voltage level in excess of a threshold value, said threshold value being related to said first voltage level and the turns ratio of said transformer.

22. The circuit of claim 20, wherein said second voltage level develops after said first switching means stops conducting.

23. The circuit of claim 20, wherein said first winding is coupled between said modulating means and said first switching means.

24. The circuit of claim 20, wherein said second winding is coupled between a source of ground potential and said polarized switching means.

25. The circuit of claim 20, wherein said polarized switching means is coupled between said second winding and said voltage source.

26. The circuit of claim 20, wherein said polarized switching means comprises a diode.

27. The circuit of claim 20, wherein said first switching means is responsive to a pulse width modulating signal varying as a vertical rate parabola.

28. The circuit of claim 20, wherein said modulating means comprises a diode modulator.

* * * * *

UNITED STATES PATENT AND TRADEMARK OFFICE
CERTIFICATE OF CORRECTION

PATENT NO. : 5,043,637

DATED : August 27, 1991

INVENTOR(S) : Robert Joseph Gries, et al.

It is certified that error appears in the above-identified patent and that said Letters Patent is hereby corrected as shown below:

Column 8, after line 68, add the following claims:

13. The circuit of claim 9, wherein said clamping means comprises a diode coupled between said second winding and said voltage source.

14. The circuit of claim 9, wherein said modulating means comprises a diode modulator.

15. The circuit of claim 9, wherein said supplying means comprises an output switch responsive to a pulse width modulating signal varying as a vertical rate parabola.

16. A horizontal deflection system, comprising:
a horizontal deflection yoke;
a resonant retrace circuit coupled to said yoke and to a switched energy source for generating a horizontal deflection current in said yoke;
a diode modulator coupled to said resonant retrace circuit;
means operable in a switched mode for supplying a control signal to said diode modulator for modifying said deflection current to correct for side pincushion distortion;
a transformer having a first winding coupled to said diode modulating means and to said supplying means for recovering energy from said diode modulating means and a second winding for receiving said recovered energy from said first winding; and,
a diode clamp coupled to said second winding and to a load driven by a voltage source at a first voltage level, for transferring said recovered energy from said second winding to said load, energy being transferred from said first winding to said second winding at a second voltage level across said second winding determined by the turns ratio of said transformer.

17. The circuit of claim 16, wherein said first winding is coupled between said diode modulating means and said supplying means.

UNITED STATES PATENT AND TRADEMARK OFFICE
CERTIFICATE OF CORRECTION

PATENT NO. : 5,043,637

DATED : August 27, 1991

INVENTOR(S) : Robert Joseph Gries, et al.

It is certified that error appears in the above-identified patent and that said Letters Patent is hereby corrected as shown below:

18. The circuit of claim 16, wherein said second winding is coupled between said diode clamp and a source of ground potential.

19. The circuit of claim 16, wherein said first winding is coupled between said diode modulating means and said supplying means and said second winding is coupled between said diode clamp and a source of ground potential.

20. A deflection circuit, comprising:
resonant retrace means for modulating a deflection current;
first switching means for controlling said modulating means;
polarized switching means coupled to a load driven by a voltage source; and,
a transformer having a first winding coupled to said modulating means and to said first switching means for conducting a first current in said first winding when said first switching means is conducting and having a second winding coupled to said polarized switching means for conducting a second current to said load through said polarized switching means when said first switching means becomes nonconducting, for transferring energy from said modulating means to said load.

21. The circuit of claim 20, wherein said polarized switching means conducts when said first winding develops a second voltage level in excess of a threshold value, said threshold value being related to said first voltage level and the turns ratio of said transformer.

22. The circuit of claim 20, wherein said second voltage level develops after said first switching means stops conducting.

23. The circuit of claim 20, wherein said first winding is coupled between said modulating means and said first switching means.

UNITED STATES PATENT AND TRADEMARK OFFICE
CERTIFICATE OF CORRECTION

PATENT NO. : 5,043,637

DATED : August 27, 1991

INVENTOR(S) : Robert Joseph Gries, et al.

It is certified that error appears in the above-identified patent and that said Letters Patent is hereby corrected as shown below:

24. The circuit of claim 20, wherein said second winding is coupled between a source of ground potential and said polarized switching means.

25. The circuit of claim 20, wherein said polarized switching means is coupled between said second winding and said voltage source.

26. The circuit of claim 20, wherein said polarized switching means comprises a diode.

27. The circuit of claim 20, wherein said first switching means is responsive to a pulse width modulating signal varying as a vertical rate parabola.

28. The circuit of claim 20, wherein said modulating means comprises a diode modulator.

Signed and Sealed this

Fourth Day of October, 1994

Attest:

BRUCE LEHMAN

Attesting Officer

Commissioner of Patents and Trademarks